(12) United States Patent
Priou et al.

(10) Patent No.: US 6,218,445 B1
(45) Date of Patent: Apr. 17, 2001

(54) STABLE POLYORGANOSILOXANE BASED COMPOSITIONS WITH CROSS-LINKABLE FUNCTIONAL GROUPS AND THEIR USE FOR PRODUCING ANTIADHESIVE COATING

(75) Inventors: Christian Priou, West Windsor, NJ (US); Andre Soldat, Lyons (FR); Stuart R. Kerr, III, Rock Hill; Reeshemah Beaty, Chester, both of SC (US)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/242,713
(22) PCT Filed: Aug. 14, 1997
(86) PCT No.: PCT/FR97/01492
 § 371 Date: Jan. 10, 2000
 § 102(e) Date: Jan. 10, 2000
(87) PCT Pub. No.: WO98/07798
 PCT Pub. Date: Feb. 26, 1998

(30) Foreign Application Priority Data

Aug. 21, 1996 (FR) .................................................. 96 10330

(51) Int. Cl.[7] .............................. C08F 2/50; C08K 5/17; C08L 83/06; C08L 83/07
(52) U.S. Cl. .................................. 522/25; 522/31; 522/78; 522/99; 522/148; 524/714; 524/722; 528/13; 528/21; 528/23; 528/32; 528/33
(58) Field of Search ................................ 522/148, 99, 170, 522/172, 181, 31; 528/32, 40, 13, 21, 23, 33; 524/714, 722

(56) References Cited

U.S. PATENT DOCUMENTS

| | | | |
|---|---|---|---|
| 4,684,726 | * | 8/1987 | Greco et al. . |
| 4,946,880 | * | 8/1990 | Costanzi et al. . |
| 4,988,607 | * | 1/1991 | Ali . |
| 5,227,410 | * | 7/1993 | Eckberg et al. . |
| 5,494,943 | * | 2/1996 | Mahoney et al. . |
| 5,703,137 | * | 12/1997 | Priou et al. . |
| 5,731,125 | * | 3/1998 | Yamachika et al. . |
| 5,837,792 | * | 11/1998 | Meuwly et al. . |
| 5,973,020 | * | 10/1999 | Kerr, III et al. . |

FOREIGN PATENT DOCUMENTS

| | | | |
|---|---|---|---|
| 0 555 058 | * | 8/1993 | (EP) . |
| 0 576 247 A2 | | 12/1993 | (EP) . |
| 0 697 449 A2 | | 2/1996 | (EP) . |
| 0 703 236 A1 | | 3/1996 | (EP) . |

* cited by examiner

*Primary Examiner*—Susan W. Berman
(74) *Attorney, Agent, or Firm*—Burns, Doane, Swecker & Mathis, L.L.P

(57) ABSTRACT

The invention concerns a composition cross-linkable under radiation. The composition includes at least one polyorganosiloxane with cross-linkable functional groups, a stabilizing amino agent, and an initiator system for hardening under radiation. The composition is stable for use and storage.

19 Claims, No Drawings

STABLE POLYORGANOSILOXANE BASED COMPOSITIONS WITH CROSS-LINKABLE FUNCTIONAL GROUPS AND THEIR USE FOR PRODUCING ANTIADHESIVE COATING

The present invention relates to stable compositions based on polyorganosiloxanes containing cationically crosslinkable functional groups, to their use for preparing anti-adherent or anti-adhesive coatings and to articles consisting of a solid support, at least one surface of which is made anti-adherent or anti-adhesive by coating with the said functional polyorganosiloxanes crosslinked by photochemical or thermal activation and/or by activation with a beam of electrons.

It is known practice, for preparing anti-adhesive coatings, to use compositions based on a polyorganosiloxane containing functional groups (such as epoxy, vinyl ether, etc.) to which is added a cationic initiator onium salt for the crosslinking (patents U.S. Pat Nos. 4,450,360; 4,576,999; 4,640,967).

It has been found that the best results are obtained with onium salts in which the anion is $SbF_6^-$. However, initiators containing this type of anion are difficult to manipulate and have considerable risks of toxicity.

Moreover, compositions based on UV-crosslinkable polyorganosiloxanes of the prior art can have problems of stability and of ageing in the presence or absence of light. In particular, it has been found that in the presence of a photoinitiator in the said compositions conditioned in liquid form, uncontrolled polymerization reactions of the polyorganosiloxanes took place in the medium without UV irradiation.

Furthermore, when a photoinitiator is used under liquid conditioning, it has a tendency to degrade, in particular releasing traces of acids, and gives reduced performance if it is used after a long period of storage.

The Applicant has found and developed novel compositions based on at least one polyorganosiloxane containing crosslinkable functional groups, these compositions having virtually none of the drawbacks of the compositions of the prior art. In particular, these novel polyorganosiloxane-based compositions contain a stabilizing amino agent capable of neutralizing the traces of acids, and have markedly improved stability on storage and during their use. Thus, uncontrolled polymerization reactions in the compositions are all but eliminated, without, however, reducing the ability of the said compositions to crosslink under controlled conditions.

The novel compositions in accordance with the invention are based:
- on at least one polyorganosiloxane containing cationically crosslinkable functional groups,
- an initiator system for curing under radiation, in particular UV radiation, and
- an amino agent having properties of substantially improving the stability on storage and during use of the mixture of the polyorganosiloxane(s) with the photoinitiator.

The curing-initiator systems used in the compositions according to the invention are advantageously onium salts. In particular, the onium salts are chosen from at least one element from groups 15 to 17 of the Periodic Table (Chem. & Eng. News, Vol. 63, No. 5, 26 of Feb. 4, 1985), the cationic species and anionic species of which are defined below. The curing-initiator systems used in the context of the invention comprise one or more onium salts.

The cationic species of the onium salt is chosen from:
(1) Onium salts of formula $$[(R_1)_n\text{—}A\text{—}(R_2)_m]^+ \quad (I)$$

in which:
A represents an element from groups 15 to 17, such as I, S, Se, P and N,
the symbol $R_1$ represents a $C_6$–$C_{20}$ carbocyclic or heterocyclic aryl radical, preferably phenyl, tolyl or toluyl, it being possible for the said heterocyclic radical to contain at least one hetero element, preferably nitrogen and/or sulphur,
the symbol $R_2$ represents $R_1$, a linear or branched alkyl or alkenyl radical containing 1 to 30 carbon atoms,
the said radicals $R_1$ and $R_2$ optionally being substituted with an alkoxy group containing between 1 and 25 carbon atoms, an alkyl group containing 1 to 25 carbon atoms, a nitro group, a chloro group, a bromo group, a cyano group, a carboxyl group and/or a mercapto group,
n is an integer ranging from 1 to v+1, v being the valency of the element A,
m is an integer ranging from 0 to v−1, with n+m=v+1.
(2) The oxoisothiochromanium salts of formula:

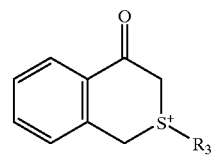

in which the symbol $R_3$ represents a linear or branched alkyl radical containing 1 to 20 carbon atoms, a linear or branched cycloalkyl radical containing 1 to 20 carbon atoms, or an aryl radical.

By way of example, the oxoisothiochromanium salts which can be used are those which are described in particular in patent application WO A90/11303 (published on Oct. 4, 1990). As oxoisothiochromanium salts which are particularly suitable, mention will be made in particular of the sulphonium salt of 2-ethyl-4-oxoisothiochromanium or of 2-dodecyl-4-oxoisothiochromanium.

The anionic species of the said onium salt is chosen from the group consisting of $SbF_6^-$, $PF_6^-$, $AsF_6^-$, $CF_3SO_3^-$, $BF_4^-$, $BCl_4^-$, $B(O_3SCF_3)_4^-$, $B(O_3SC_2F_5)_4^-$, $B(O_3SC_4F_9)_4^-$. However, other anionic species can also be used, such as those described in patent application EP-A-697,449 (page 4, lines 28 to 37).

In addition, in the case of an anionic borate species, this can be chosen from the group consisting of the species of formula $[BX_a(R_4)_b]^-$ (II), which moreover comprises $BF_4^-$, $BCl_4^-$, in which:
a is an integer between 0 and 4,
b is an integer between 0 and 4, with a+b=4,
the symbols X represent:
a halogen atom, preferably chlorine or fluorine,
an OH function with a=0 to 2,
the symbols $R_4$ are identical or different and represent:
a phenyl radical substituted with at least one electron-withdrawing group, preferably $CF_3$, $OCF_3$, $NO_2$ or CN, or with at least two halogen atoms, preferably fluorine,
an aryl radical containing at least two aromatic rings, such as biphenyl or naphthyl, optionally substituted with at least one electron-withdrawing element or group, preferably $CF_3$, $NO_2$ or CN or a halogen atom, in particular fluorine.

Advantageously, the anionic borate species is the following anions:

| | | |
|---|---|---|
| $[B(C_6F_5)_4]^-$ | $[B(C_6H_4CF_3)_4]^-$ | $[B(C_6H_3(CF_3)_2)_4]^-$ |
| $[(C_6F_5)_2BF_2]^-$ | $[B(C_6H_4OCF_3)_4]^-$ | $[B(C_6H_3F_2)_4]^-$ |

The onium salts of formula I are described in many documents, in particular in patents U.S. Pat. Nos. 4,026,705; 4,069,056; 4,136,102; 4,173,476. In particular, the cations used in the context of the invention are the following:

| | |
|---|---|
| $[(\Phi)_2I]^+$ | $[C_8H_{17}\text{-O-}\Phi\text{-I-}\Phi]^+$ |
| $[C_{12}H_{25}\text{-}\Phi\text{-I-}\Phi]^+$ | $[(C_8H_{17}\text{-O-}\Phi)_2I]^+$ |
| $[(\Phi)_3S]^+$ | $[(\Phi)_2\text{-S-}\Phi\text{-O-}C_8H_{17}]^+$ |
| $[\Phi\text{-S-}\Phi\text{-S-}(\Phi)_2]^+$ | $[(C_{12}H_{25}\text{-}\Phi)_2I]^+$ |
| $[CH_3\text{-}\Phi\text{-I-}\Phi\text{-CH}(CH_3)_2]^+$ | $[CH_3\text{-}\Phi\text{-I-}\Phi\text{-CH}_3]^+$ |
| et$[(\Phi)_2\text{S-}\Phi\text{-S-}\Phi\text{-S}(\Phi)_2]^{+2}$ | |

In accordance with the invention, the initiators used are advantageously the following onium borates:

| | |
|---|---|
| $[(\Phi\text{-}CH_3)_2I]^+, [B(C_6F_5)_4]^-,$ | $[(\Phi)_2I]^+, [B(C_6F_5)_4]^-,$ |
| $[C_{12}H_{25}\text{-}\Phi\text{-I-}\Phi]^+, [B(C_6F_5)_4]^-,$ | $[(C_8H_{17}\text{-O-}\Phi\text{-I-}\Phi]^+,$ |
| | $[B(C_6F_5)_4]^-,$ |
| $[(C_8H_{17}\text{-O-}\Phi)_2I]^+, [B(C_6F_5)_4]^-,$ | $[(\Phi)_2I]^+, [B(C_6H_3(CF_3)_2)_4]^-,$ |
| $[(\Phi)_2\text{S-}\Phi\text{-O-}C_8H_{17}]^+, [B(C_6H_4CF_3)_4]^-,$ | $[(C_{12}H_{25}\text{-}\Phi)_2I]^+, [B(C_6F_5)_4]^-,$ |
| $[CH_3\text{-}\Phi\text{-I-}\Phi\text{-CH}(CH_3)_2]^+, [B(C_6F_5)_4]^-,$ | $[(\Phi)_3S]^+, [B(C_6F_5)_4]^-,$ |
| $[CH_3\text{-}\Phi\text{-I-}\Phi\text{-CH}(CH_3)_2]^+,$ | and |
| $[B(C_6H_4OCF_3)_4]^-,$ | |
| $2[B(C_6F_5)_4]^-, [(\Phi)_2\text{S-}\Phi\text{-S-}\Phi\text{-S}(\Phi)_2]^{+2}$ | |

The onium borates used in the compositions according to the present invention can be prepared by an exchange reaction between a salt of the cationic species and an alkali metal (for example sodium, lithium or potassium) salt of the anionic species. The salt of the cationic species can be, for example, a halide such as a chloride or an iodide, whereas the alkali metal in the salt of the anionic species can be sodium, lithium or potassium.

The operating conditions (respective amounts of reagents, choice of solvents, duration, temperature, stirring) are known and are within the capabilities of person skilled in the art; these conditions must make it possible to recover the desired initiator salt in solid form by filtration of the precipitate formed, or in oily form by extraction with a suitable solvent.

The alkali metal salts of the anionic species can be prepared in a known manner, by an exchange reaction between a haloboron compound and an organometallic (magnesium, lithium or tin) compound bearing the desired hydrocarbon-based groups, in stoichiometric amount, the said reaction optionally being followed by a hydrolysis using an aqueous alkali metal halide solution; this type of synthesis is described, for example, in "J. of organometallic Chemistry" Vol. 178, pp. 1–4, 1979; "J.A.C.S" 82, 1960, 5298; "Anal. Chem. Acta" 44, 1969, pp. 175–183; patents U.S. Pat. No. 4,139,681 and DE-A-2,901,367; "Zh. Org. Khim." Vol. 25, No. 5—pp. 1099–1102; May 1989.

The photoinitiator is generally in solid (powder) form and is generally placed in the form of a solution in a solvent or diluent. The weight proportions between the photoinitiator (s), on the one hand, and the solvent, on the other hand, are between 0.1 and 99 parts per 100 parts of solvent and preferably from 10 to 50 parts.

The solution is then used to prepare a bath with the polyorganosiloxane(s) containing cationically-crosslinkable functional groups, such that the concentration of the photoinitiator(s) present is between 0.05 and 2% by weight in the said bath, and preferably between 0.2 and 0.6%.

The solvents which can be used for the photoinitiator are many and varied and are chosen depending on the photoinitiator used and the other constituents of the composition of the invention.

In general, the solvents can be alcohols, esters, ethers, ketones, chloro compounds or nitriles.

The alcohols commonly used are para-tolylethanol, isopropylbenzyl alcohol, benzyl alcohol, methanol, ethanol, propanol, isopropanol and butanol. The ethers commonly used are 2-methoxyethanol, 2-ethoxyethanol, diethylene glycol and polyethylene glycol 200. The usual esters are dibutyl maleate, dimethyl ethylmalonate, methyl salicylate, dioctyl adipate, butyl tartrate, ethyl lactate, n-butyl lactate and isopropyl lactate. Other solvents which can be used for the photoinitiator bath and which fall within the other categories of solvents mentioned above are acetonitrile, benzonitrile, acetone, cyclohexanone, tetrahydrofuran, dichloromethane and chlorobenzene.

In addition, among the solvents which can be used to dissolve the photoinitiator(s), certain types of proton-donating organic solvents of aromatic nature and certain types of hydroxylated carboxylic acid esters have properties not only of dissolving the photoinitiators but also of significantly improving their performance in terms of reactivity and kinetics. These two types of solvent, known as reagent diluents, are described below and are advantageously used as solvent for the photoinitiator(s).

The proton-donating organic solvent of aromatic nature is formed by at least one benzyl alcohol of general formula (III) below:

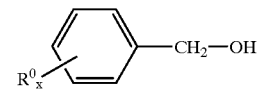

in which:
the groups $R^0$ are identical or different and represent an electron-donating or electron-withdrawing group chosen from linear or branched alkyls containing 1 to 12 carbon atoms, linear or branched alkoxys containing 1 to 12 carbon atoms, cycloalkyls, cycloalkoxys or aryls, which are preferably optionally substituted with halogens, or radicals such as, for example, $NO_2$, x is an integer between 0 and 5.

Preferably, $R^0$ represents a methyl, t-butyl or isopropyl group.

The second type of solvent in which the photoinitiator is preferably dissolved is chosen from hydroxylated carboxylic acid esters which are liquid at room temperature (23° C.) of general formula:

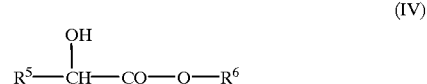

in which:
the symbols $R_5$ and $R_6$ are identical or different and represent:

a linear or branched $C_1$–$C_{10}$ alkyl radical, optionally substituted with a linear or branched $C_1$–$C_4$ alkoxy group, a $C_4$–$C_{10}$ cycloalkyl radical, optionally substituted with one or more linear or branched $C_1$–$C_4$ alkyl or alkoxy groups, a $C_6$–$C_{12}$ aryl radical, optionally substituted with one or more linear or branched $C_1$–$C_4$ alkyl or alkoxy groups, and/or an aralkyl or aroxyalkyl radical in which the aryl part is a $C_6$–$C_{12}$ group optionally substituted with one or more linear or branched $C_1$–$C_4$ alkyl or alkoxy groups, and the alkyl part is a linear or branched $C_1$–$C_4$ group, the symbol $R_5$ possibly also representing:

a linear or branched $C_1$–$C_{15}$ alkoxy radical, and/or a $C_4$–$C_{10}$ cycloalkyloxy radical, optionally substituted with one or more linear or branched $C_1$–$C_4$ alkyl or alkoxy groups.

These hydroxylated carboxylic acid esters, as solvent, have properties which make it possible to significantly improve the performance in terms of reactivity and kinetics of the photoinitiators, as well as the final properties of the crosslinked coatings obtained.

In particular, the most advantageous results are obtained with this type of solvent formed by at least one hydroxylated carboxylic acid ester of general formula (IV) in which:

$R_5$ represents a linear $C_1$–$C_3$ alkyl radical, and
$R_6$ represents a linear or branched $C_2$–$C_6$ alkyl radical.

More preferably, the solvent used is formed by at least one lactic acid ester of general formula (IV) in which $R_5$ represents a methyl radical and $R_6$ represents a linear $C_3$–$C_5$ alkyl radical. In this case, the weight proportions of photoinitiators are from 10 to 50 parts per 100 parts of solvent. This preferred family of solvents, moreover, has the advantage of being very cost-effective, relatively non-toxic, easy to manipulate and compatible with the known initiator salts.

The cationically-crosslinkable polyorganosiloxanes forming part of the composition of the invention have functional groups such as epoxy and/or vinyl ether.

The said polyorganosiloxanes are linear or substantially linear and consist of units of formula (V) and end with units of formula (VI), or are cyclic and consist of units of formula (III) represented below:

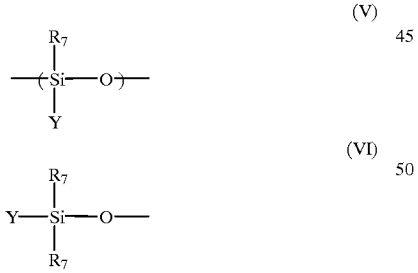

in which:

the symbols $R_7$ are identical or different and represent:

a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl, a cycloalkyl radical containing between 5 and 8 cyclic carbon atoms, which is optionally substituted, an aryl radical containing between 6 and 12 carbon atoms, which may be substituted, preferably phenyl or dichlorophenyl, an aralkyl part having an alkyl part containing between 1 and 4 carbon atoms and an aryl part containing between 6 and 12 carbon atoms, optionally substituted on the aryl part with halogens, alkyls and/or alkoxys containing 1 to 3 carbon atoms, the symbols Y are identical or different and represent:

the group $R_7$, a hydrogen radical and/or a cationically-crosslinkable organofunctional group, preferably an epoxy functional and/or vinyloxy functional group, connected to the silicon of the polyorganosiloxane via a divalent radical containing from 2 to 20 carbon atoms and possibly containing at least one hetero atom, preferably oxygen, and at least one of the symbols Y representing a cationically-crosslinkable functional organic group.

Preferably, at least one of the symbols $R_7$ of the polyorganosiloxanes used in the compositions according to the invention represents a phenyl, xylyl, tolyl or dichlorophenyl radical.

Furthermore, it is advantageous for at least 60 mol % of the radicals $R_7$ of the polyorganosiloxanes used in the compositions according to the invention to be methyl radicals.

According to a preferred variant of the invention, 1 to 50%, preferably 5 to 25%, of the silicon atoms of the polyorganosiloxane bear one crosslinkable functional group.

The epoxy functional groups Y are generally chosen from:

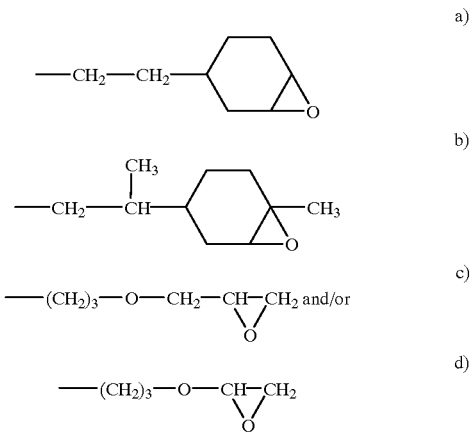

Preferably the functional groups correspond to a).

In addition, the vinyloxy functional groups Y are generally chosen from:

$(CH_2)_3$—O—CH=$CH_2$

—O—$(CH_2)_4$—O—CH=$CH_2$ and/or $(CH_2)_3$—O—$R_8$—O—CH=$CH_2$ in which $R_8$ is:

a linear or branched $C_1$–$C_{12}$ alkylene which may be substituted, a $C_6$–$C_{12}$ arylene, preferably phenylene, which may be substituted, preferably with 1 to 3 $C_1$–$C_6$ alkyl groups.

More particularly, the polyorganosiloxanes used in the compositions according to the invention are of formula:

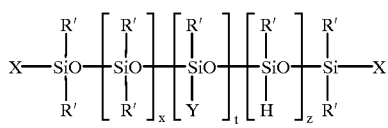
(VII)

in which:
the symbols R' have the same meaning as $R_7$ above for the formulae (V) and (VI), and preferably, when R' is a linear or branched alkyl radical, it contains 1 to 4 carbon atoms, the symbols X are identical or different and represent a monovalent radical chosen from Y, H and/or OH, x is an integer or fraction ranging from 20 to 150, preferably 30 to 100, t is an integer or fraction ranging from 3 to 9, preferably 6 to 9, and z is an integer or fraction ranging from 0 to 5; preferably 0 to 2.

The epoxy functional polyorganosiloxanes can be prepared by a hydrosilylation reaction between oils containing Si-H units and epoxy functional compounds such as 1,2-epoxy-4-vinylcyclohexane or allyl glycidyl ether.

The vinyloxy functional polyorganosiloxanes can be prepared by a hydrosilylation reaction between oils containing Si-H units and vinyloxy functional compounds such as allyl vinyl ether or allylvinyloxyethoxybenzene.

The epoxy functional or vinyloxy functional polyorganosiloxanes used in the context of the invention are generally in the form of fluids having a dynamic viscosity at 25° C. of from 10 to 10,000 mm²/s and preferably from 100 to 600 mm²/s.

The dynamic viscosity at 25° C. of all of the silicones considered in the present description can be measured using a Brookfield viscometer, according to AFNOR standard NFT 76 102 of February 1972.

The stabilizing amino agent used in the compositions according to the invention contains at least one amine whose boiling point is greater than 150° C. and preferably greater than 200° C. This amine can be a secondary amine or a tertiary amine.

The amine which can be used in the compositions of the invention is:

(1) a secondary or tertiary amine of formula (VIII):

in which $R_9$, $R_{10}$ and $R_{11}$ are identical and/or different and chosen from the group consisting of:
a linear or branched monovalent alkyl, alkoxy or alkylene radical containing between 1 and 12 carbon atoms, and possibly containing and/or being substituted with at least one hetero atom, preferably an oxygen, sulphur or nitrogen atom (in order to form, for example, a reactive function such as an epoxy, ketone or hydroxyl group),
a monovalent cycloalkyl radical containing between 3 and 9 carbon atoms and possibly containing and/or being substituted with at least one hetero atom, preferably an oxygen, sulphur or nitrogen atom (for example a reactive function such as an epoxy, ketone or hydroxyl group), and
a hydrogen radical, (2) or a sterically hindered cyclic amine of formula (IX):

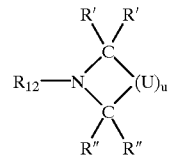

in which:
$R_{12}$ corresponds to $R_9$,
R' and R" are identical or different and correspond to a linear or branched alkyl radical containing between 1 and 12 carbon atoms and possibly containing or being substituted with at least one hetero atom, preferably an oxygen, sulphur or nitrogen atom (in order to form, for example, a reactive function such as an epoxy, ketone or hydroxyl group),
U is a free valency or a methylene radical, and u is between 1 and 9, in order to form a ring which can:
contain at least one hetero atom, preferably an oxygen, sulphur or nitrogen atom, and/or
be substituted with at least one hetero atom, a linear or branched alkyl radical containing 1 to 4 atoms, the hetero atom preferably being an oxygen, sulphur or nitrogen atom (in order to form, for example, a reactive function such as an epoxy, ketone or hydroxyl group), (3) or an amine consisting of units of formula (VIII) and (IX) linked together by at least one saturated or unsaturated organic radical, at least divalent radical $R_{13}$, possibly containing and/or being substituted with a hetero atom.

As non-limiting examples, the radical $R_{13}$ can be chosen from:
linear or branched alkylene radicals containing 2 to 18 carbon atoms;
alkylenecarbonyl radicals in which the linear or branched alkylene part contains 2 to 20 carbon atoms;
alkylenecyclohexylene radicals in which the linear or branched alkylene part contains 2 to 12 carbon atoms and the cyclohexylene part contains an OH group and optionally 1 or 2 alkyl radicals containing 1 to 4 carbon atoms;
radicals of formula —$R_{14}$—O—$R_{14}$ in which the identical or different radicals $R_{14}$ represent alkylene radicals containing 1 to 12 carbon atoms;
radicals of formula —$R_{14}$—O—$R_{14}$ in which the radicals $R_{14}$ have the meanings given above and one or both of them are substituted with one or two —OH groups;
radicals of formula —O—CO—$R_{14}$ in which the radical $R_{14}$ has the meaning given above;
radicals of formula —$R_{14}$—COO—$R_{14}$ in which the radicals $R_{14}$ have the meanings given above;
radicals of formula —$R_{15}$—O—$R_{16}$—O—CO—$R_{15}$ in which the identical or different radicals $R_{15}$ and $R_{16}$ represent alkylene radicals containing 2 to 12 carbon atoms and the radical $R_{16}$ is optionally substituted with a hydroxyl radical;

a trivalent group of formula:

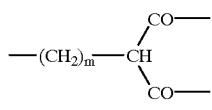

where m represents a number from 2 to 20;

a trivalent group of formula:

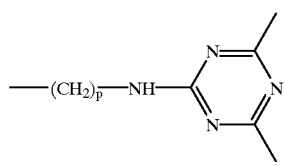

where p represents a number from 2 to 20.

Preferably, the sterically hindered amines in accordance with the compositions according to the invention contain, α to the nitrogen atom, alkyl groups containing 1 to 4 carbon atoms, and preferably methyl groups. According to another preferred variant of the invention, the sterically hindered amines contain piperidyl units.

It should be noted that most of the hindered amines used as agents for providing stability to light ("LSHAs") prove to be very good candidates for satisfying the requirements of the stabilizers used in the context of the invention, although their intrinsic light-stabilizing property has no direct relationship with the mode of action of the stabilizing amino agents in the compositions according to the invention. In this respect, it is possible to use the various types of hindered amine in documents EP 162,524 and EP 263,561.

Many types of hindered amine which are industrially available have given good results, and in particular:

- the products Tinuvin sold by the company Ciba Geigy, in particular the products Tinuvin 144 and Tinuvin 292 of formulae (X) and (XI) respectively,
- the products Cyagard sold by Cytec, in particular the product Cyagard UV 1164L, and
- the products Sanduvar, in particular the product Sanduvar 3055, of formula (XII) sold by the company Sandoz.

(X)

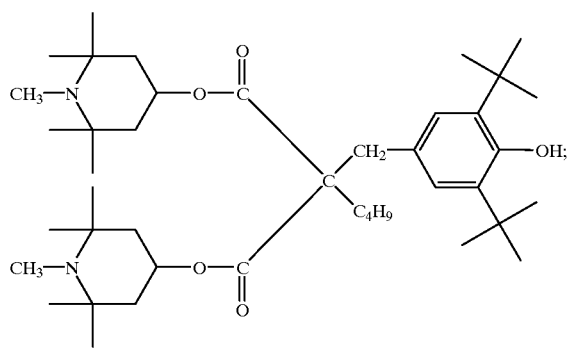

(XI)

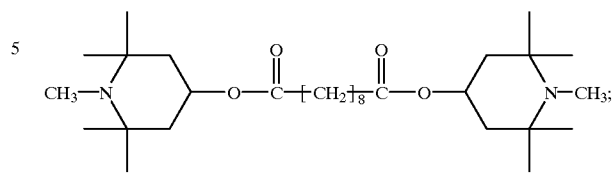

(XII)

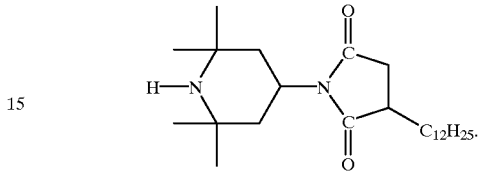

Other types of amine corresponding to formulae (VIII) and (IX) are also good candidates for use in the compositions of the invention; by way of example, the structure of some of these amines is given below:

(XIII)

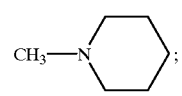

(XIV)

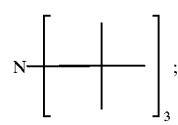

(XV)

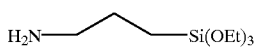

(XVI)

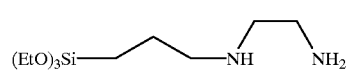

The percentage of amino agent generally used by weight relative to the total weight of the oil is between 1 and 1000 ppm and preferably between 10 and 100 ppm. In the case of an LSHA-type amino agent, the amount is from about 20 to about 100 ppm.

The compositions according to the invention can also contain other ingredients such as adhesion modifiers for increasing or decreasing the adhesion forces obtained from the polyorganosiloxane alone (linear silicone resins or polymers bearing vinyl, epoxy, vinyl ether or alcohol functions), pigments, photosensitizers, fungicides, bactericides and antimicrobial agents, corrosion inhibitors, etc.

The compositions according to the invention are useful in the sector of anti-adherent coatings on cellulose materials, films, paints, the encapsulation of electrical and electronic components, coatings for textiles, as well as for sheathing optical fibres.

They are most particularly advantageous when they are used in liquid form in order to make a material, such as metal sheets, glass, plastics or paper, non-adherent to other materials to which it would normally adhere.

The compositions in accordance with the invention advantageously have a viscosity not exceeding 5000 mPa.s, preferably not exceeding 4000 mPa.s, at 25° C. As a variant, compositions whose bath viscosity is between 200 and 1000 mpa.s at 25° C. will be preferred.

The invention is also directed towards a process for making the surface of a first article (for example sheets) non-adherent when the surface comes into contact with a second article, the surface of the first article normally being adherent to the surface of the second article. This process for preparing an article with a non-adherent surface comprises the following steps:
a) applying an amount of the composition according to the invention, generally of between 0.1 and 5 g per m² of the surface of the said article,
b) crosslinking the composition by providing energy, at least some of which, preferably all of which, is supplied by UV radiation.

The UV radiation used has a wavelength of between 200 and 400 nanometers. The irradiation time can be short and is generally less than 1 second and is about a few hundredths of a second for the very small thicknesses of compositions deposited on the surfaces. The crosslinking is advantageously carried out in the absence of any heating. However, heating to between 25 and 100° C. is not excluded from the invention.

Furthermore, the curing time can be adjusted, in particular by a number of UV lamps used, by the duration of exposure to the UV and by the distance between the composition and the UV lamp.

The solvent-free i.e. undiluted, compositions are applied using devices suitable for uniformly depositing small amounts of liquids. To this end, the device known as "Helio glissant" can be used, for example, this device in particular containing two superposed rollers; the role of the lower roller, which dips into the coating vat containing the composition, is to coat the upper roller with a very thin layer, the role of this upper roller then being to deposit the desired amounts of composition with which it is impregnated onto the paper; such metering is obtained by adjusting the respective speed of the two rollers which rotate in opposite directions to each other.

The amounts of compositions deposited on the supports are variable and usually range between 0.1 and 5 g per m² of surface treated. These amounts depend on the nature of the supports and on the desired anti-adherent properties. They are usually between 0.5 and 3 g/m² for non-porous supports.

Another subject of the present invention is articles (for example sheets) consisting of a solid material (metal, glass, plastic, paper, etc.), at least one surface of which is coated with the composition described above, which is photo-crosslinked or crosslinked with a beam of electrons.

The articles, materials or supports thus coated can subsequently be placed in contact with other adhesive materials such as, for example, certain materials of rubber or acrylic type. After pressure contact, the adhesive materials can readily be detached from the article coated with the photo-crosslinked composition.

EXAMPLES

The examples which follow are given for illustrative purposes and cannot be considered as a limitation of the field or spirit of the invention.

I. Constituents of the Compositions

The functionalized polyorganosiloxanes used in the examples are (1,2-epoxy-4-ethylcyclohexyl) polydimethylsiloxanes of formula (XVII) in which a and b have the respective average values 7 and 73.

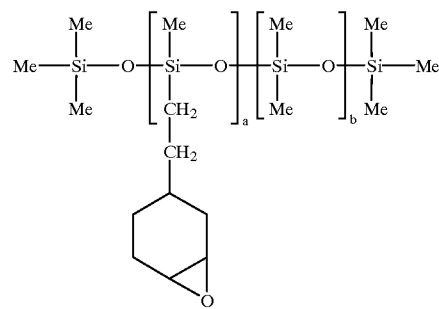

The photoinitiator used in the examples is an onium borate; ditolyliodonium tetrakis(pentafluorophenyl)borate:

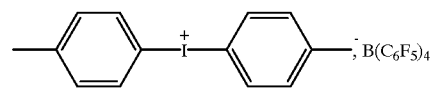

The cationic species of this onium borate and the onium borate are prepared according to the general methodology described in European patent applications Nos. 562,922 and 562,897.

The anionic borate species is prepared according to the procedure below.

Bromopentafluorobenzene (21.3 g, 0.086 mol) and isopropyl ether are loaded, under an inert atmosphere, into a 500 ml round-bottomed flask fitted with a mechanical stirrer, a condenser and a dropping funnel. The mixture is stirred and is cooled to a temperature of −78° C. using an acetone+cardice bath.

n-Butyllithium dissolved in hexane (1.6 M, 52.3 ml, 0.97 eq) is loaded into the dropping funnel and is then added over about 10 minutes. The mixture is then left stirring for 30 min at a temperature of −78° C.

The dropping funnel is replaced with a dropping funnel containing boron trichloride dissolved in hexane (1.0 M, 19 ml). The boron trichloride is added over 15 min and the reaction mixture is then left stirring at the temperature of −78° C. for 30 min.

The mixture is then allowed to warm to room temperature over about 1 h. Saturated aqueous KCl solution (100 ml) is then added. At this stage, the mixture is two-phase and homogeneous. The isopropyl ether is distilled off. The KB(C₆F₅)₄ precipitates at the end of the distillation. It is recovered by filtration and is then washed with saturated KCl solution (100 ml), after which it is dried under vacuum at a temperature of 35° C.

A product with a titre of 97% of the expected product is thus obtained in a yield of 99%.

The photoinitiator system is prepared by dissolving onium borate (optionally combined with some of the polyorganosiloxane used in the compositions) in n-butyl lactate.

The stabilizing amino agent is trioctylamine for the compositions of Examples 3 and 4 and Tinuvin 292 for the compositions of Examples 5, 6, 9 and 10.

II. Preparations of Compositions According to the Invention

Example 1

A solution of onium borate at 20% by weight in n-butyl lactate is prepared at t₁=0.

2.5 parts by weight of the 20% onium borate solution are added to 100 parts by weight of polyorganosiloxane of formula (XVII) at time $t_2=t1+\in$ (i.e. immediately after the preparation of the onium borate solution).

The mixture is stirred manually for 1 min.

Example 2

A solution of onium borate at 20% by weight in n-butyl lactate is prepared at $t_1=0$.

2.5 parts by weight of a 20% onium borate solution are added to 100 parts by weight of polyorganosiloxane of formula (XVII) at time $t_3=t1+6$ months (i.e. exactly 6 months after the preparation of the onium borate solution).

The mixture is stirred manually for 1 min.

Example 3

A solution of onium borate at 20% by weight in n-butyl lactate is prepared at $t_1=0$.

2.5 parts by weight of a 20% onium borate solution are added to 100 parts by weight of polyorganosiloxane of formula (XVII), into which 50 ppm of trioctylamine have been introduced beforehand, at time $t_2=t1+\in$ (i.e. immediately after the preparation of the onium borate solution).

The mixture is stirred manually for 1 min.

Example 4

A solution of onium borate at 20% by weight in n-butyl lactate is prepared at $t_1=0$.

2.5 parts by weight of a 20% onium borate solution are added to 100 parts by weight of polyorganosiloxane of formula (XVII), into which 50 ppm of trioctylamine have been introduced beforehand, at time $t_3=t1+6$ months (i.e. exactly 6 months after the preparation of the onium borate solution).

The mixture is stirred manually for 1 min.

Example 5

A solution of onium borate at 20% by weight in n-butyl lactate is prepared at $t_1=0$.

2.5 parts by weight of a 20% onium borate solution are added to 100 parts by weight of polyorganosiloxane of formula (XVII), into which 50 ppm of Tinuvin™ 292 have been introduced beforehand, at time $t_2=t1+\in$ (i.e. immediately after the preparation of the onium borate solution).

The mixture is stirred manually for 1 min.

Example 6

A solution of onium borate at 20% by weight in n-butyl lactate is prepared at $t_1=0$.

2.5 parts by weight of a 20% onium borate solution are added to 100 parts by weight of polyorganosiloxane of formula (XVII), into which 50 ppm of Tinuvin™ 292 have been introduced beforehand, at time $t_3=t1+6$ months (i.e. exactly 6 months after the preparation of the onium borate solution).

The mixture is stirred manually for 1 min.

Example 7

The conditions are identical to those of Example 1, except for the amounts of polyorganosiloxane of formula (XVII) and of 20% onium borate solution.

3 parts by weight of the onium borate solution are added to a mixture of 90 parts by weight of polyorganosiloxane of formula (XVII) and 10 parts by weight of polyorganosiloxane of formula similar to (XVII) in which a=2 and b=200.

The mixture is stirred manually for 1 min.

Example 8

The conditions are identical to those of Example 2, except for the amounts of polyorganosiloxane of formula (XVII) and of 20% onium borate solution.

3 parts by weight of the onium borate solution are added to a mixture of 90 parts by weight of polyorganosiloxane of formula (XVII) and 10 parts by weight of polyorganosiloxane of formula similar to (XVII) in which a=2 and b=200.

The mixture is stirred manually for 1 min.

Example 9

A solution of onium borate at 20% by weight in n-butyl lactate is prepared at $t_1=0$.

3 parts by weight of a 20% onium borate solution are added at time $t_2=t1+\in$ (i.e. immediately after the preparation of the onium borate solution) to a mixture of 90 parts by weight of polyorganosiloxane of formula (XVII) and 10 parts by weight of polyorganosiloxane of formula similar to (XVII) in which a=2 and b=200, into which 50 ppm of Tinuvin™ 292 have been introduced beforehand.

The mixture is stirred manually for 1 min.

Example 10

A solution of onium borate at 20% by weight in n-butyl lactate is prepared at $t_1=0$.

3 parts by weight of a 20% onium borate solution are added at time $t_3=t1+6$ months (i.e. exactly 6 months after the preparation of the onium borate solution) to a mixture of 90 parts by weight of polyorganosiloxane of formula (XVII) and 10 parts by weight of polyorganosiloxane of formula similar to (XVII) in which a=2 and b=200, into which 50 ppm of Tinuvin™ 292 have been introduced beforehand.

The mixture is stirred manually for 1 min.

III. Tests

The following are measured for each composition prepared above in the examples
  the VNC gel time,
  the gel time at 45° C. in the dark,
  the gel time as a thin layer on PET film.
  Measurement of the VNC gel time under UV The reactivity tests described in the examples which follow were carried out on a machine for measuring the VNC (vibrating needle curometer) gel point, sold by the company RAPRA Ltd., to which a UV irradiation device was added (Ultracure 100 ss UV generator).

During the crosslinking, the VNC needle inserted into the mixture to be studied encounters a resistance which is expressed by a decrease in the output voltage of the apparatus. The gel time is the time measured at the maximum vibration damping point.

Measurement of the gel time at 45° C.

The composition to be tested is conditioned in a glass flask. The flask is closed and then placed in a water bath at 45° C. The assembly is placed in the absence of light.

The passage from the liquid state to the solid state (hours, days) is examined visually over time and in the absence of light.

Measurement of the gel time as a thin layer on PET polyester film

Using a water bath at 45° C. prepared as above, the composition to be tested is deposited on a polyester film. The composition is spread out so as to obtain a layer about 2 to 3 microns in thickness. The change of the coating is examined over time by touching with a finger and the time corresponding to a dry feel (=polymerization time) is noted.

The results of the measurements are given in Table 1.

The amine-free compositions give satisfactory results when the photoinitiator solution is prepared immediately before use. When this solution is not used rapidly after preparation (Examples 2 and 8), the test results are negative and do not make it possible to use the compositions to be crosslinked under suitable conditions to allow controlled and controllable crosslinking.

Moreover, the test results for the compositions prepared in accordance with the invention show that these compositions can be used even after prolonged storage.

Furthermore, it should be noted that the best results are obtained with the compositions containing an amino agent consisting of a sterically hindered amine. For these compositions (Examples 5, 6, 9 and 10), the VNC gel time is less than 1 minute, the 45° C./dark gel time is greater than 3 days and the PET gel time is greater than 24 hours; this reflects a stability/reactivity compromise of very great value.

TABLE 1

| Examples | 1 | 2 | 3 | 4 | 5 | 6 | 7 | 8 | 9 | 10 |
|---|---|---|---|---|---|---|---|---|---|---|
| Photoinitiator/amine molar ratio | 0 | 0 | 36 | 36 | 51 | 51 | 0 | 0 | 51 | 51 |
| VNC gel time (min) | 0.24 | 0.22 | 1.50 | 1.50 | 0.45 | 0.22 | 0.20 | 0.20 | 0.40 | 0.37 |
| Gel time at 45° C./dark | >24 h | <3 min | >24 h | >24 h | >72 h | >72 h | >24 h | <3 min | >72 h | >72 h |
| Gel time on PET film/dark | 20 h | / | 20 h | 20 h | 26 h | 25 h | 20 h | / | 26 h | 24 h |

What is claimed is:

1. Composition which is crosslinkable under radiation, said composition comprising at least one polyorganosiloxane containing cationically crosslinkable functional groups of epoxy and/or vinyl ether, a stabilizing amino agent, and an initiator system for curing under radiation, by photochemical or thermal activation and/or with a beam of electrons; said stabilizing amino agent comprising at least one amine whose boiling point is greater than 150° C.; said initiator system comprising at least one onium salt; said composition being stable during use and on storage.

2. Stable composition which is crosslinkable under radiation, according to claim 1, wherein the composition is in homogeneous liquid form.

3. Stable crosslinkable composition according to claim 1, wherein the at least one amine has a boiling point greater than 200° C.

4. Stable crosslinkable composition according to claim 1, wherein the amine(s) comprise:

(1) a secondary or tertiary amine of formula (VIII):

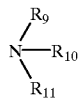

wherein $R_9$, $R_{10}$ and $R_{11}$ are identical or different and comprise:
a linear or branched monovalent alkyl, alkoxy or alkylene radical containing between 1 and 12 carbon atoms, and optionally comprising and/or being substituted with at least one hetero atom, a monovalent cycloalkyl radical containing between 3 and 9 carbon atoms and optionally comprising and/or being substituted with at least one hetero atom, or a hydrogen radical, (2) a sterically hindered cyclic amine of formula (IX):

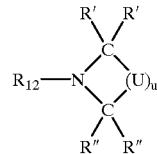

wherein:
$R_{12}$ corresponds to $R_9$,
R' and R" are identical or different and correspond to a linear or branched alkyl radical containing between 1 and 12 carbon atoms and optionally comprising or being substituted with at least one hetero atom,
U is a free valency or a methylene radical, and u is between 1 and 9, in order to form a ring which can:

contain at least one hetero atom, and/or
be substituted with at least one hetero atom, a linear or branched alkyl radical containing 1 to 4 atoms, or (3) an amine comprising units of formula (VIII) and (IX) linked together by at least one saturated or unsaturated organic radical, optionally comprising and/or being substituted with a hetero atom.

5. Stable crosslinkable composition according to claim 4, wherein said at least one saturated or unsaturated organic radical is a divalent radical or a trivalent group.

6. Stable crosslinkable composition according to claim 4, wherein the amine is a sterically hindered cyclic amine containing, α to the nitrogen atom, alkyl groups of 1 to 4 carbon atoms.

7. Stable crosslinkable composition according to claim 6, wherein the sterically hindered amine is an amine comprising at least one piperidyl unit.

8. Stable crosslinkable composition according to claim 1, wherein the initiator system comprises at least one onium salt of an element from groups 15 to 17 of the Periodic Table, in which the cationic species of said onium salt is a group of formula:

$$[(R_1)_n-A-(R_2)_m]^+ \qquad (I)$$

wherein:
A represents an element from groups 15 to 17,
$R_1$ represents a $C_6$–$C_{20}$ carbocyclic or heterocyclic aryl radical, said heterocyclic radical optionally comprising nitrogen and/or sulphur as hetero elements,
$R_2$ represents $R_1$, or a linear or branched alkyl or alkenyl radical containing 1 to 30 carbon atoms, $R_1$ and $R_2$ optionally being substituted with an alkoxy group comprising between 1 and 25 carbon atoms, an alkyl group comprising 1 to 25 carbon atoms, a nitro group, a chloro group, a bromo group, a cyano group, a carboxyl group and/or a mercapto group, n is an integer ranging from 1 to v+1, v being the valency of the element A, and m is an integer ranging from 0 to v−1, with n+m=v+1.

9. Stable composition which is crosslinkable under radiation, according to claim 8, wherein the curing initiator comprises at least one onium salt of an element from groups 15 to 17 of the Periodic Table, wherein the anionic species of said onium salt comprises $SbF_6^-$, $BF_4^-$, $PF_6^-$, $CF_3SO_3^-$, $B(O_3SCF_3)_4^-$, $B(O_3SC_2F_5)_4^-$ and/or $B(O_3SC_4F_9)_4^-$.

10. Stable crosslinkable composition according to claim 9, wherein the onium salt is selected from the group consisting of:

| | |
|---|---|
| $[(\Phi\text{-}CH_3)_2I]^+ [B(C_6F_5)_4]^-$, | $[(C_8H_{17}\text{-}O\text{-}\Phi\text{-}I\text{-}\Phi]^+$, $[B(C_6F_5)_4]^-$, |
| $[C_{12}H_{25}\text{-}\Phi)_2I]^+ [B(C_6F_5)_4]^-$, | $[CH_3\text{-}\Phi\text{-}I\text{-}\Phi\text{-}CH(CH_3)_2]^+$ $[B(C_6F_5)_4]^-$, |
| $[CH_3\text{-}\Phi\text{-}I\text{-}\Phi\text{-}CH(CH_3)_2]^+$ $[B(C_6H_4OCF_3)_4]^-$, | and |
| $2[B(C_6F_5)_4]^- [(\Phi)_2S\text{-}\Phi\text{-}S\text{-}\Phi\text{-}S(\Phi)_2]^{+2}$. | |

11. Stable composition which is crosslinkable under radiation, according to claim 8, wherein the curing initiator comprises at least one onium salt of an element from groups 15 to 17 of the Periodic Table, wherein the anionic species of said onium salt comprises an anionic borate species of formula $[BX_a(R_4)_b]^-$ (II), wherein:

a is an integer between 0 and 3, b is an integer between 1 and 4, with a+b=4, the symbols X represent:
   a halogen atom, with a=0 to 3,
   an OH function with a=0 to 2, the symbols $R_4$ are identical or different and represent:
   a phenyl radical substituted with at least one electron-withdrawing group, or with at least two halogen atoms,
   an aryl radical containing at least two aromatic rings, optionally substituted with at least one electron-withdrawing element or group.

12. Composition according to claim 1, wherein said polyorganosiloxane is linear or substantially linear and comprises units of formula (V) and ends with units of formula (VI), or is cyclic and comprises units of formula (V):

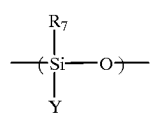

(V)

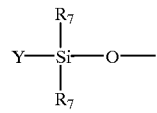

(VI)

wherein:
   the symbols $R_7$ are identical or different and represent:
      a linear or branched alkyl radical comprising 1 to 8 carbon atoms, optionally substituted with at least one halogen,
      a cycloalkyl radical comprising between 5 and 8 cyclic carbon atoms, which is optionally substituted,
      an aryl radical containing between 6 and 12 carbon atoms, which may be substituted,
      an aralkyl radical having an alkyl part comprising between 1 and 4 carbon atoms and an aryl part comprising between 6 and 12 carbon atoms, the aryl part optionally substituted with halogens, alkyls and/or alkoxys comprising 1 to 3 carbon atoms,
   the symbols Y are identical or different and represent:
      the group $R_7$, a hydrogen radical and/or
      a cationically crosslinkable organofunctional group bonded to the silicon of the polyorganosiloxane via a divalent radical containing from 2 to 20 carbon atoms and optionally comprising at least one hetero atom, or
      at least one of the symbols Y representing a cationically-crosslinkable functional organic group.

13. Composition according to claim 12, wherein the said polyorganosiloxane has a viscosity at 25° C. of from about 10 to 10,000 mm²/s.

14. Process for preparing a crosslinkable composition according to claim 1, wherein the process comprises the following steps:
   a) mixing an amino agent with the polyorganosiloxane in order to form a first stabilized composition,
   b) next, adding a second miscible composition comprising the curing initiator in order to form said crosslinkable composition.

15. Process for preparing a crosslinkable composition according to claim 14, wherein the second composition is in liquid form, the curing initiator optionally being dissolved in a solvent which is compatible with the polyorganosiloxane.

16. Anti-adherent coating composition which is obtained by the process according to claim 14.

17. Process for preparing articles with a non-adherent surface, wherein said process comprises the following steps:
   a) applying between 0.1 and 5 g, per m² of the surface of said article, of the composition according to claim 1, and
   b) crosslinking said composition by providing energy, at least some of which is supplied by ultraviolet (UV) radiation.

18. Process according to claim 17, wherein the crosslinking operation is carried out by UV radiation of wavelength from about 200 to 400 nanometers.

19. Article with an anti-adherent surface which is obtained by the process according to claim 17.

* * * * *